United States Patent
Elgimiabi (10) Patent No.: US 9,452,462 B2
(45) Date of Patent: Sep. 27, 2016

(54) METAL PANEL ASSEMBLY AND METHOD FOR MAKING SAME

(75) Inventor: Sohaib Elgimiabi, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 38 days.

(21) Appl. No.: 14/122,289

(22) PCT Filed: Apr. 17, 2012

(86) PCT No.: PCT/US2012/033857
§ 371 (c)(1),
(2), (4) Date: Nov. 26, 2013

(87) PCT Pub. No.: WO2012/166257
PCT Pub. Date: Dec. 6, 2012

(65) Prior Publication Data
US 2014/0193603 A1    Jul. 10, 2014

(30) Foreign Application Priority Data

May 31, 2011    (EP) ..................................... 11168221

(51) Int. Cl.
*B21D 39/02*    (2006.01)
*B62D 27/02*    (2006.01)
(Continued)

(52) U.S. Cl.
CPC ........... *B21D 39/021* (2013.01); *B21D 39/028* (2013.01); *B60J 5/0469* (2013.01);
(Continued)

(58) Field of Classification Search
CPC ... B21D 39/021; B21D 39/028; B60J 5/0469
USPC ....................................................... 29/469.5
See application file for complete search history.

(56) References Cited

U.S. PATENT DOCUMENTS 3,018,262 A    1/1962    Schroeder
3,445,436 A    5/1969    Lake
(Continued)

FOREIGN PATENT DOCUMENTS

DE    19927207    12/2000
DE    102008060930    4/2010
(Continued)

OTHER PUBLICATIONS

International Search Report for PCT International Application No. PCT/US2012/033857, Mailed on Sep. 14, 2012, 3 pages.
(Continued)

*Primary Examiner* — Brent O'Hern
(74) *Attorney, Agent, or Firm* — Dena M. Ehrich; Philip Y. Dahl (57) ABSTRACT

In accordance with the present invention there is provided a method of making a metal part assembly, the method comprising: —providing a first metal part and a second metal part wherein at least one of the first and second metal part comprises a metal panel; —providing an adhesive sheet having a first portion near a first end of the adhesive sheet and a second portion near a second end opposite to the first end of the adhesive sheet, the adhesive sheet comprising a thermosettable composition that comprises a mixture of a first and second epoxy compound and an epoxy curing agent, wherein the first epoxy compound has a weight average molecular weight of at least 1000 g/mol and has an amount of epoxy groups of between 5 and 10 mole % and the second epoxy compound has a weight average molecular weight of not more than 400 g/mol and wherein the weight ratio of first to second epoxy compound is between 0.8 and 4; —adhering said first and second metal part together such that the adhesive sheet is provided between said first and second metal part thereby forming a metal joint; and heating the metal joint so as to cause thermosetting of the thermosettable composition of the adhesive sheet.

10 Claims, 1 Drawing Sheet

(51) Int. Cl.
  *C09J 5/06*   (2006.01)
  *C09J 163/00* (2006.01)
  *B60J 5/04*   (2006.01)
  *F16B 11/00*  (2006.01)

(52) U.S. Cl.
  CPC ........... *B62D 27/02* (2013.01); *B62D 27/026* (2013.01); *C09J 5/06* (2013.01); *C09J 163/00* (2013.01); *C09J 2400/163* (2013.01); *C09J 2463/00* (2013.01); *F16B 11/006* (2013.01); *Y10T 29/49906* (2015.01); *Y10T 428/192* (2015.01)

(56) References Cited

U.S. PATENT DOCUMENTS

| | | |
|---|---|---|
| 4,145,369 A | 3/1979 | Hira |
| 5,019,605 A | 5/1991 | Jannic |
| 6,000,118 A | 12/1999 | Biernat |
| 6,348,249 B2 | 2/2002 | Meyer |
| 6,368,008 B1 | 4/2002 | Biernat |
| 6,528,176 B1 | 3/2003 | Asai |
| 2016/0024356 A1 | 1/2016 | Salnikov et al. |

FOREIGN PATENT DOCUMENTS

| | | | |
|---|---|---|---|
| EP | 0798354 | 6/2000 | |
| EP | 1785340 | 5/2007 | |
| EP | 2383053 | 11/2011 | |
| GB | 2455292 | 6/2009 | |
| JP | S61-41537 | 2/1986 | |
| JP | S62-43480 | 2/1987 | |
| JP | S62-86083 | 4/1987 | |
| WO | WO 01-29143 | 4/2001 | |
| WO | WO 0129143 A1 * | 4/2001 | ........ C09J 5/06 |
| WO | WO 2009-071269 | 6/2009 | |

OTHER PUBLICATIONS

1507 Extended Search Report EP 11168221.7, PCT/US2012/033857, dated Nov. 17, 2011, 5 pages.

Lee, Handbook of Epoxy Resins, (1967).

* cited by examiner

METAL PANEL ASSEMBLY AND METHOD FOR MAKING SAME

CROSS REFERENCE TO RELATED APPLICATIONS

This application is a national stage filing under 35 U.S.C. 371 of PCT/US2012/033857, filed Apr. 17, 2012, which claims priority to European Application No. 11168221.7, filed May 31, 2011, the disclosures of which are incorporated by reference in their entireties herein.

The present invention relates to a metal part assembly wherein one of the metal parts is a metal panel. The invention also relates to a method for joining two metal parts.

Metal joints in vehicles may be formed through the use of an adhesive. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel.

U.S. Pat. No. 6,368,008 disclose the use of an adhesive for securing two metal panels together. The edge of the joint is sealed by a metal coating. WO 2009/071269 discloses an expandable epoxy paste adhesive as a sealant for a hem flange. A further hemmed structure is disclosed in U.S. Pat. No. 6,528,176.

It would now be desirable to find a solution whereby two metal panels, in particular an outer and an inner panel of a vehicle closure panel, can be joined with an adhesive without the need for a further material for sealing the joint. Thus, it will be desirable to find an adhesive that provides adequate bonding while also sealing the joint and providing corrosion resistance. Typically the joint of the metal panels for a vehicle closure panel is formed early in the manufacturing process where the panels are often contaminated for example with grease or oil. It would thus be desirable to find an adhesive for securing the panels to each other that is oil-compatible and that in particular allows the build up of an adhesive bond of adequate strength notwithstanding the presence of oil on the surface of the metal panels. It would moreover be desirable that an initial adhesive bond of sufficient strength can be formed such that the metal parts can be held together without the need for clamping during further handling of the joint and prior to thermosetting and forming of the final and permanent bond. The final adhesive bond desirably has good crash resistance and preferably has a good elongation at break such that stress that might be created at the joint can be absorbed without causing failure of the bond. It would be desirable to find a solution that enables automation of the process of forming the metal joint between the metal plates and hence it would be desired that the adhesive can be applied by automated equipment.

In accordance with the present invention there is provided a method of making a metal part assembly, the method comprising:
- providing a first metal part and a second metal part wherein at least one of the first and second metal part comprises a metal panel;
- providing an adhesive sheet having a first portion near a first end of the adhesive sheet and a second portion near a second end opposite to the first end of the adhesive sheet, the adhesive sheet comprising a thermosettable composition that comprises a mixture of a first and second epoxy compound and an epoxy curing agent, wherein the first epoxy compound has a weight average molecular weight of at least 1000 g/mol and has an amount of epoxy groups of between 5 and 10 mole % and the second epoxy compound has a weight average molecular weight of not more than 400 g/mol and wherein the weight ratio of first to second epoxy compound is between 0.8 and 4;
- adhering said first and second metal part together such that the adhesive sheet is provided between said first and second metal part thereby forming a metal joint; and
- heating the metal joint so as to cause thermosetting of the thermosettable composition of the adhesive sheet.

In a further aspect of the present invention there is provided a metal part assembly A metal part assembly comprising:
- a first metal part and a second metal part wherein at least one of the first and second metal part comprises a metal panel and
- an adhesive sheet having a first portion near a first end of the adhesive sheet and a second portion near a second end opposite to the first end of the adhesive sheet, whereby the adhesive sheet is between said first and second metal part and adheres the first and second metal part together, and wherein the adhesive sheet comprises the thermoset reaction product of a thermosettable composition as defined in above.

In a particular embodiment, one of the metal parts is a roof panel and the other metal part is a support structure, for example the chassis of the vehicle.

The metal parts and panels are typically steel parts and panels but other metal parts and panels such as aluminium parts and panels may be used as well in connection with the invention. In a particular embodiment, the metal parts are unpainted, i.e. they are body in white parts as they are known or called in the automotive industry.

It has been found that the adhesive sheet used in connection with the method typically allows bonding of the metal parts and panels to an adequate level while also providing good sealing properties on the joint thereby providing corrosion resistance. Further, the adhesive sheet can generally be applied to metal parts and panels that may be contaminated to some extent with for example oil and generally there will be no need for cleaning of the parts or panels prior to applying the adhesive sheet. Application of the adhesive sheet through automated equipment such as robot heads is conceivable as well. Further, the adhesive sheets in connection with the present invention conveniently can be used to form an initial bond of the metal parts in the metal joint such that the metal parts can be held together during further handling of the metal joint during further manufacturing steps such as for example painting without the need for clamping the metal parts together. Accordingly, the adhesive sheet typically can provide enough adhesive strength for holding the metal parts together prior to thermosetting or curing of the adhesive sheet thereby forming a permanent bond between the metal parts. Further, in a particular embodiment, the adhesive sheet is sufficiently resistant to washing out and accordingly, the metal parts joint together by the adhesive sheet can be subjected to a washing operation, for example as may be necessary prior to painting.

The following is a summary of particular embodiments according to the invention:

1. A method of making a metal part assembly, the method comprising:
    providing a first metal part and a second metal part wherein at least one of the first and second metal part comprises a metal panel;
    providing an adhesive sheet having a first portion near a first end of the adhesive sheet and a second portion near a second end opposite to the first end of the adhesive sheet, the adhesive sheet comprising a thermosettable composition that comprises a mixture of a first and second epoxy compound and an epoxy curing agent, wherein the first epoxy compound has a weight average molecular weight of at least 1000 g/mol and has an amount of epoxy groups of between 5 and 10 mole % and the second epoxy compound has a weight average molecular weight of not more than 400 g/mol and wherein the weight ratio of first to second epoxy compound is between 0.8 and 4;
    adhering said first and second metal part together such that the adhesive sheet is provided between said first and second metal part thereby forming a metal joint; and
    heating the metal joint so as to cause thermosetting of the thermosettable composition of the adhesive sheet.
2. A method according to embodiment 1 wherein one of said first and second metal part comprise a roof panel and the other metal part comprises a support structure.
3. A method according to embodiment 1, wherein
    the first metal part comprises a first metal panel having a first body portion and a first flange along a margin of the first body portion adjacent a first end of the first body portion;
    the second metal part comprises a second metal panel having a second body portion and a second flange along a margin of the second body portion adjacent a second end of the second body portion; and wherein
    the adhesive sheet is adhered to said first or second metal panel;
    the first flange of the first panel is folded over said second flange of said second panel;
    whereby following adhering and folding a metal joint is obtained wherein the adhesive sheet is folded such that the first portion of the adhesive sheet is between the second flange of said second panel and said first body portion of said first panel and the second portion of the adhesive sheet is between said first flange of said first panel and said second flange of said second panel;
    heating the metal joint so as to cause thermosetting of the thermosettable composition of the adhesive sheet.
4. A method according to embodiment 3 wherein said adhesive sheet is adhered to said second metal panel with the adhesive sheet being adhered to the second flange of the second metal panel and folded around the second end of the second metal panel such that the adhesive sheet is adhered to opposite sides of the second flange of the second metal panel.
5. A method according to embodiment 3 wherein the adhesive sheet is adhered to the first metal panel.
6. A method according to any of the previous embodiments wherein the thermosettable composition further comprises a hydrophobizing agent.
7. A method according to embodiments 6 where the hydrophobizing agent comprises hydrophobic fumed silica particles.
8. A method according to any of the previous embodiments wherein the weight ratio of first to second epoxy compound is between 0.8 and 3.
9. A method according to any of the previous embodiments wherein the weight average molecular weight of the first epoxy compound is between 1000 and 3000 g/mol.
10. A method according to any of the previous embodiments wherein the thermosettable composition further comprises a blowing agent.
11. A method according to embodiment 10 wherein the blowing agent is encapsulated.
12. A method according to any of the previous embodiments wherein the epoxy curing agent comprises a compound selected from the group consisting of amines, dicyandiamides, guanidines, acid anhydrides and mixtures thereof
13. A method according to any of the previous embodiments wherein the thermosettable composition further comprises a toughening agent.
14. A method according to any of the previous embodiments wherein the thermosettable composition further comprises a film forming agent.
15. A method according to any of the previous embodiments wherein the adhesive sheet comprises a netting.
16. A method according to any of the previous embodiments wherein between forming the metal joint and heating of the metal joint, the metal joint is painted.
17. A method according to any of the previous embodiments wherein the heating of the metal joint is carried out in one or more steps at a temperature between 60 and 200° C.
18. A metal part assembly comprising:
    a first metal part and a second metal part wherein at least one of the first and second metal part comprises a metal panel and
    an adhesive sheet having a first portion near a first end of the adhesive sheet and a second portion near a second end opposite to the first end of the adhesive sheet, whereby the adhesive sheet is between said first and second metal part and adheres the first and second metal part together, and wherein the adhesive sheet comprises the thermoset reaction product of a thermosettable composition as defined in any of embodiments 1 and 6 to 15.
19. A metal part assembly according to embodiment 18 wherein one of said first and second metal part comprise a roof panel and the other metal part comprises a support structure.
20. A metal part assembly according to embodiment 18 wherein
    the first metal part comprises a first metal panel having a first body portion and a first flange along a margin of the first body portion adjacent a first end of the first body portion;
    the second metal part comprises a second metal panel having a second body portion and a second flange along a margin of the second body portion adjacent a second end of the second body portion; and wherein said second flange of said second panel extends over said first body of said first panel with the second end of said second panel adjacent to said first flange of said first panel;

said first flange of said first panel is folded over said second flange of said second panel;

the first portion of the adhesive sheet is between and adhering said second flange of said second panel and said first body portion of said first panel;

the second portion of the adhesive sheet is folded over said second flange of said second panel and adheres said first flange of said first panel to said second flange of said second panel.

The invention will be further described with reference to the following schematic figures without the intention to limit the invention thereto.

Figure 1:
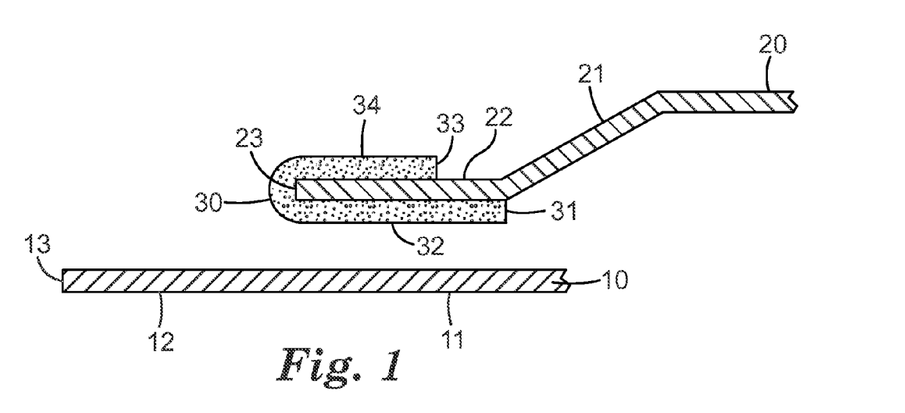
FIG. 1 is a cross-sectional view of a metal part assembly in accordance with the present invention.

FIG. 1 shows an embodiment in connection with the present invention. As shown in FIG. 1, the outer panel comprises a body portion 11 with a flange 12 along a margin of the body portion near end 13 of the outer panel. The flange 12 is folded over flange 22 of the inner panel 20. Flange 22 of inner panel is along a margin of body portion 21 of the inner panel near end 23. End 23 is adjacent flange 12 of the outer panel 10. An adhesive sheet 30 is between the inner 20 and outer panel 10. A portion 32 near end 31 of adhesive sheet 30 is between body portion 11 of outer panel 10 and the flange 22 of inner panel 20. The adhesive sheet 30 is folded over inner panel 20 and hence portion 34 near end 33 of the adhesive sheet 30 is between flange 12 of the outer panel and flange 22 of the inner panel. The adhesive sheet 30 bonds the two metal panels together at the joint or hem.

Figure 2:
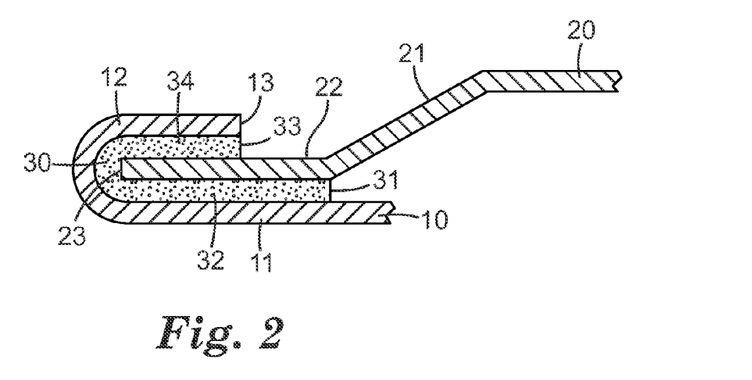
FIG. 2 is an embodiment showing a cross-sectional view of an inner panel with an adhesive sheet applied thereto and an outer panel 10 before joining it with the inner panel.

In accordance with one embodiment illustrated in FIG. 2, a metal part assembly in accordance with the present invention, for example as illustrated in FIG. 1, may be obtained by adhering the adhesive sheet 30 to the inner metal panel 20. However, it is also possible to instead adhere the adhesive sheet 30 to the outer panel prior to joining the metal panels (not illustrated). As shown in FIG. 2, adhesive sheet 30 is adhered to the inner panel 20 at opposite sides of flange 22 of the inner panel and adhesive sheet 30 is folded around end 23 of the inner panel. In one embodiment, the adhesive sheet 30 has a surface that is tacky at ambient temperature, typically about 20° C., and can be adhered to the inner panel via this tacky surface. Typically, the adhesive sheet will allow forming an adhesive bond sufficient to hold the metal parts together in the metal joint without requiring curing of the thermosettable composition of the adhesive sheet.

The outer panel 10 may then be folded such that the flange 12 of the outer panel is folded over the flange 22 of the inner panel 20 and over portion 34 of adhesive sheet 30. Accordingly, outer panel 10 will be folded over inner panel 20 with the adhesive sheet between the two panels and thus a metal joint is obtained. In case the adhesive sheet 30 was adhered to the outer panel 10 instead of inner panel 20, the adhesive sheet 30 will be folded in-between the panels during folding of the outer panel 10 over flange 22 of the inner panel 20.

The metal joint obtained is then heated to cause thermosetting of the thermosettable composition of the adhesive sheet, thereby forming a permanent adhesive bond between the panels and sealing the joint. This heating step can conveniently be performed whilst the panel assembly is being painted and baked as part of a usual vehicle manufacturing process. However, as desired, a separate heating or baking step of the metal joint may be provided as well. Typically the temperature for heating the metal joint and to cause adhering and sealing, is between 60 and 200° C., for example between 100 and 150° C. Heating may be carried out in one or more steps. For example two or more heating cycles at different temperatures in the aforementioned range may be carried out. For example in an embodiment, a first heating step may heat the metal joint to a temperature between 60 and 100° C. and in a further heating step a higher temperature of between 80 and 200° C. may be used. The heating time may vary but is typically between 5 minutes and 60 min., for example between 10 and 30 min. When several heating steps are used, the time for each of the heating steps may vary and may be within the aforementioned ranges.

The adhesive sheet for use in connection with the present invention comprises a thermosettable composition that comprises a mixture of a first and second epoxy compound and an epoxy curing agent. The first epoxy compound has a weight average molecular weight of at least 1000 g/mol. Typically, the first epoxy compound has a weight average molecular weight between 1000 and 3000 g/mol, for example between 1500 and 2500 g/mol. The first epoxy compound further has an amount of epoxy groups of between 5 and 10%, for example between 6 and 8%. The second epoxy compound has a weight average molecular weight of not more than 400 g/mol, for example between 200 g/mol and 350 g/mol. The weight ratio of first to second epoxy compound is between 0.8 and 4, for example between 0.9 and 3 or between 0.9 and 2.8.

Any organic compound having an oxirane ring polymerizable by a ring opening reaction may be used as an epoxy compound in the thermosettable composition of the adhesive sheet. Such materials, broadly called epoxies, include monomeric epoxy compounds and polymeric epoxy compounds and can be aliphatic, cycloaliphatic, aromatic or heterocyclic. Useful materials generally have at least two polymerizable epoxy groups per molecule and, more preferably, from two to four polymerizable epoxy groups per molecule.

The thermosettable composition of the adhesive sheet comprises a first epoxy compound which is a high molecular weight epoxy compound and a second epoxy compound which is a low molecular weight epoxy compound.

The first epoxy compound or high molecular weight epoxy compound preferably has an average epoxy functionality of at least 2 and, more preferably, of between 2 and 4. The weight average molecular weight of the first epoxy compound is at least 1000 g/mol, for example between 1000 and 3000 g/mol. The backbone may be of any type and it is preferably essentially halogen-free and, in particular, chlorine-free. Any substituents can also be essentially halogen-free or brominated and may otherwise be any group not having a nucleophilic or an electrophilic moiety (such as an active hydrogen atom) that is reactive with an oxirane ring. Permissible substituents include ester groups, ether groups, sulfonate groups, siloxane groups, nitro groups, amide groups, nitrile groups, phosphate groups, etc. Mixtures of various organic epoxies may also be used as first and/or second epoxy compounds in the thermosettable composition. Suitable high molecular weight epoxy compounds are commercially available, for example, from Leuna Harze GmbH under the trade designation Epilox™ A50-02 Resolution Performance Products Epikote™ 1001.

The second epoxy compound or low molecular weight epoxy compound is preferably selected from the group of epoxy compounds having an average epoxy functionality, i.e. an average number of polymerizable epoxy groups per molecule, of at least 2 and, more preferably, from 2 to 4. The weight average molecular weight of the low molecular weight epoxy compound should be 400 g/mol or less, for example between 200 and 350 g/mol. These low molecular weight epoxy compounds are generally liquid at room temperature and are frequently also referred to as reactive epoxy thinners or reactive epoxy diluents. These compounds are preferably selected from the group of optionally substituted di- and polyglycidyl ethers of di- and polyphenols or aliphatic or cycloaliphatic hydroxyl compounds. Suitable low molecular weight epoxy compounds are commercially available, for example, from Resolution performance products Epikote™ 828 and DER 331, DER 332, DER 334 from Dow Chemical Co.

Epoxy compounds which are useful in the adhesive sheet as low molecular weight or high molecular weight epoxy compounds, respectively, are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or therebetween. More preferably, the organic epoxies are selected from the group comprising diglycidyl ethers of bisphenol A and bisphenol F and epoxy novolacs. Other useful organic epoxies include those disclosed in U.S. Pat. No. 5,019,605, 4,145,369, 3,445,436, and 3,018,262, and Handbook of Epoxy Resins by Lee and Neville, McGraw Hill Book Co., New York (1967).

The amount of high molecular weight epoxy compound in the thermosettable composition of the adhesive sheet is typically between 15 and 60 wt. %, for example between 20 and 45 wt. % based on total weight of the thermosettable composition. The amount of low molecular weight epoxy compound in the thermosettable composition of the adhesive sheet is typically between 5 and 40 wt. %, for example between 10 and 30 wt. % based on total weight of the thermosettable composition. The weight ratio of the amount of the first or high molecular weight epoxy compound over the amount of the second or lower molecular weight epoxy compound is between 0.8 and 4, for example between 0.9 and 3 or between 0.9 and 2.8.

Epoxide hardeners or epoxy curing agents useful in the thermosettable composition are materials that react with the oxirane ring of the organic epoxide to cause substantial cross-linking of the epoxide. These materials contain at least one nucleophilic or electrophilic moiety (such as an active hydrogen atom) that causes the cross-linking reaction to occur.

Epoxide hardeners are distinct from epoxide chain extension agents, which primarily become lodged between chains of the organic epoxide and cause little, if any cross-linking.

Epoxy hardeners as used herein are also known in the art as curing agents, catalysts, epoxy curatives, and curatives.

Sometimes it is differentiated between epoxide hardeners and accelerators which are used to increase the rate of the epoxide curing reaction. Accelerators typically are multifunctional materials which can also be classified as epoxide hardeners. Therefore, in the present specification, no differentiation is made between hardeners and accelerators.

Epoxide hardeners useful in the invention include those which are conventionally used for curing epoxy resin compositions and forming crosslinked polymer networks. Such agents include aliphatic and aromatic primary amines, for example, di-(4-aminophenyl)sulfone, di-(4-aminophenyl)-ethers, and 2,2-bis(4-aminophenyl)propane. Such compounds also include aliphatic and aromatic tertiary amines such as dimethylaminopropylamine and pyridine, which may act as catalysts to generate substantial crosslinking. Further, boron complexes, in particular boron complexes with monoethanolamine, imidazoles such as 2-ethyl-methylimidazole, guanidines such as tetramethyl guanidine, substituted ureas such as toluene diisocyanate urea, dicyanodiamide, and acid anhydrides such as the 4-methyltetrahydroxyphthalic acid anhydride, 3-methyltetrahydroxyphthalic acid anhydride and methylnorbornenephthalic acid anhydride, may be employed. Still other useful hardeners include polyamines, mercaptans and phenols. Preferably, the epoxide hardener is selected from the group consisting of amines, acid anhydrides, guanidines, dicyandiamide and mixtures thereof. More preferably the epoxide hardener is a mixture of dicyandiamide and 2,4-di-(N'N'-dimethylureido)toluene.

The thermosettable composition of the adhesive sheet comprises between 1 and 40 wt. % and more preferably between 2 and 25 wt. % (based on total weight of the thermosettable composition) of one or more epoxide curing agents.

In a particular embodiment, the thermosettable composition furthermore includes one or more toughening agents in an amount of 10 to 30 wt. % based on total weight of the thermosettable composition and more preferably of between 12.5 and 25 wt. %. The toughening agents are preferably selected from a group comprising core-shell toughening agents, CTBNs (carboxyl and/or nitrile terminated butadiene/nitrile rubbers) and high molecular weight amine terminated polytetramethylene oxide.

Core-shell toughening agents which are especially preferred, usually comprise different materials in the inner core region and the outer shell region, respectively. Preferably, the core may be harder than the shell but this is not required. The shell may comprise harder material and/or the shell may be layered in its construction. Most preferably, the inner hard core component is comprised of a single and/or a plurality of organic polymers and inorganic oxides from the first, second and/or third transition series of the periodic table such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. The soft shell preferably includes modifications with functionalities such as carboxyl, hydroxyl, epoxy, cyanates, isocyanates, amino, and thiol which can react with the epoxy components of the precursor.

Core-shell toughening agents which are useful in the thermosettable composition are commercially available, for example, from Rohm and Hass under the trade designation Paraloid™.

CTBN toughening agents react through their carboxyl and/or nitrile functional groups with the epoxide component of the precursor during curing thereby introducing their butadiene/nitrile rubber portion as a soft, shock-absorbing segment into the epoxy network forming a hard segment.

CTBN toughening agents which are useful in the present invention are commercially available, for example, from Hanse Chemie AG, Hamburg, Germany, under the trade designation "Albipox™".

A high molecular weight amine terminated polytetramethylene oxide useful in the thermosettable composition is commercially available, for example, from 3M Company, St. Paul/MN, USA, under the trade designation "3M EPX™ Rubber".

The amount of the one or more toughening agents present in the thermosettable composition will vary from about 10 to 30 wt. %, more preferably from about 12.5 to 25 wt. % and especially preferably from about 12.5 to 20 wt. % with respect to the mass of the thermosettable composition.

In a particularly preferred embodiment, the thermosettable composition furthermore comprises one or more blowing agents. By including a blowing agent in the thermosettable composition of the adhesive sheet, the adhesive sheet becomes heat expandable. Accordingly, by heating, for example during the heating to cause thermosetting of the adhesive sheet, the adhesive sheet expands which helps sealing of any gap in the metal joint. It has been found that as a result, corrosion resistance may be improved. The one or more blowing agents are preferably selected from the group of non-encapsulated or encapsulated blowing agents, respectively. Non-chemical blowing agents, which are sometimes also referred to as chemical blowing agents, release a gaseous compound such as nitrogen, nitrogen oxide, hydrogen or carboxide dioxide during heating.

Chemical blowing agents which are useful in the present invention include, for example, azobisisobutyronitriles, azodicarbonamides, carbazides, hydrazides, non-azo chemical blowing agents based on sodium borohydride or sodium bicarbonate/citric acid and dinitrosopentamethylenetetramine.

The amount of the one or more chemical blowing agents preferably is 0.2 to 2 wt. % and more preferably 0.5 to 1.5 wt. % with respect to the mass of the thermosettable composition.

Encapsulated blowing agents usually comprise liquified gases such as, for example, trichlorofluoromethane or hydrocarbons such as n-pentane, iso-pentane, neo-pentane, butane and/or iso-butane encapsulated in a polymeric thermoplastic shell. Upon heating the liquified gas expands and enlarges or blows up the thermoplastic shell like a "micro-balloon". Typically the one or more encapsulated blowing agents may be used in an amount of between 0.2 and 5 wt. % and more preferably of between 0.5 and 4 wt. % with respect to the mass of the thermosettable composition.

The thermosettable composition may optionally comprise further components, additives and/or agents.

The thermosettable composition may comprise one or more film forming agents, conveniently in an amount of from 0.25-5 wt. %, for example from 1-3 wt. % with respect to the mass of the thermosettable composition. Suitable film forming agents can be selected, for example, from a group of compounds comprising polyhydroxyether compounds such as phenoxy resins, polyether diamines, polyvinyl acetals including polyvinyl butyrals and mixtures thereof.

Other optional ingredients that may be incorporated into thermosettable composition include wetting agents, such as those selected from the group consisting of titanates, silanes, zirconates, zircoaluminates, phosphoric ester(s) and mixtures thereof. The wetting agent improves the mixability and processability of the composition and can also enhance the composition's handling characteristics. Useful wetting agents are disclosed in U.S. Pat. No. 5,019,605. An especially useful wetting agent is commercially available as Coatex DO-UP6L from Coatex, Gene, France.

In a particular embodiment, the thermosettable composition may comprise one or more fillers which may be used to regulate rheological properties of the precursor and adjust its viscosity to improve and adjust its processability with respect to a specific application. These are preferably inorganic fillers, including silica. Especially preferred is hydrophobic fumed silica which is commercially available as Aerosil™ from Degussa or CAB-O-S1L™ from Cabot.

The adhesive sheet and thermosettable composition can be readily prepared by a number of techniques. For example, the various components may be added under ambient conditions to a suitable internal mixing vessel, such as a Mogul mixer. The mixing temperature is not critical and the mixing of the first and second epoxy components and the optional toughening agent component is typically performed at a temperature of 80-85° C. When the epoxy curing agent component and the optional blowing agent component is added the temperature may preferably be decreased to not more than 70° C. Mixing is continued until the components form a homogeneous mixture, after which time the thermosettable composition is removed from the mixer.

Due to their excellent processability the thermosettable composition can be processed as a film by conventional application equipment such as extruders or hot-melt coaters.

The thermosettable composition can be processed as a self-supporting film or it may be applied to various substrates such as, for example, metals (for example, Al, Al alloys, titanium or stainless steel) or other substrates comprising, for example, glass, boron, carbon, Kevlar fibers, epoxy, phenols, cyanate esters and polyester matrices.

The adhesive sheet is typically a soft conformable film, and may or may not be tacky at room temperature. The thickness of the adhesive sheet material will vary widely. Useful thicknesses have been found to be in the range of about 0.05 mm (millimeters) to 25 mm. For typical joining of metal panels, thicknesses may range from 3 to 25 mm, for example 4 to 10 mm, or 5 to 8 mm.

The adhesive sheet can be packaged in the form of rolls of sheet material, rolls of tapes, i.e., lengths of material in narrow widths, or stacks of sheets cut to a desired dimension or shape for the end use. If the adhesive sheet is tacky, a release liner may be interleaved between adjacent sheets or wraps of a roll.

The adhesive sheet can include one or more layers. The adhesive sheet may also include a netting. A suitable netting includes an open cloth or fabric of a polymeric material. Generally, the netting will be soft and may be stretchable. A particular example includes a heat set, soft and stretchy open nylon knitted cloth. The netting can have a thickness of 1 to 15 $g/m^2$, for example 5 to 12 $g/m^2$. A useful material includes 3M™ Scotch-Weld™ 3336 available from 3M Co. The adhesive sheet may also include a open non-woven layer such as a scrim.

The invention is further illustrated by the following examples. These examples are merely for illustrative purposes only and are not meant to be limiting on the scope of the appended claims.

EXAMPLES

Test Methods
1. Overlap Shear Strength According to DIN EN 1465

Overlap shear strength was determined according to DIN EN 1465 using a Zwick Z050 tensile tester (commercially available by Zwick GmbH & Co. KG, Ulm, Germany) operating at a cross head speed of 13 mm/min on hot dipped galvanized steel strips (commercially available as Etalon steel, reference GC 300500AA from Societee Etalon;

France) having the following dimension 100 mm×25 mm×0.8 mm and coated with 3 g/m² Oil (PL 3802-39S commercially available from Fuchs Petrolub AG, Germany). For the preparation of an Overlap Shear Strength test assembly the epoxy film to be tested (having a thickness of 0.7 mm) was applied on one end of a first steel strip and covered by a second steel strip forming an overlap joint of 10 mm. The overlap joints were then clamped together using two binder clips and the test assemblies placed into an air circulating oven for 30 minutes at 180° C. Hereby the test assemblies were heated up and cooled down using 3° C./minute ramps. Test assemblies were then conditioned for 24 hours at ambient condition 23+/−2° C. and 50+/−% % relative humidity before testing. As the test temperatures for measuring Overlap Shear Strength were varied from −40° C. to room temperature up to +80° C., the tests assemblies were placed prior to testing on the Zwick tensile tester into an environmental chamber (commercially available by RS Simulatoren, Oberhausen, Germany) and the Overlap shear strength measured at −40° C., room temperature (23° C.+/−2° C.) and +80° C. 3 samples were measured for each of the examples at the three different test temperatures and results averaged and reported in MPa.

2. Adhesive Peel Strength According to DIN EN 1464

The Adhesive Peel strength was measured on hot dipped galvanized steel strips (commercially available by Etalon steel, reference GC 300500AA from Societee Etalon; France) having the following dimension 150 mm×25 mm×0.8 mm and coated with 3 g/m² Oil (PL 3802-39s commercially available from Fuchs Petrolub AG, Germany) according to DIN EN 1464 using a Zwick Z050 tensile tester (commercially available by Zwick GmbH & Co. KG, Ulm, Germany). The cross head speed was set for all measurements to 100 mm/min and adhesive peel strength measured at 23° C.+/−2° C. and a relative humidity of 50+/−5%. For test assembly preparation a masking tape (Scotch™ 2610 Masking Tape; commercially available from 3M, USA) was applied to a first steel strip. Hereby the masking tape was applied to visualize the bond area. The bond area had a dimension of 100 mm×25 mm. The example material to be tested was then applied to the marked bond area and covered by a second steel strip having the same dimension as the first one. The two strips were hereafter first manually pressed together and then clamped together using 2 binder clips along the bond line, in order to hold the test assembly in place. The test assemblies were cured for 30 minutes at 180° C. in an air circulating oven. Hereby the test assemblies were heated up and cooled down using 3° C./minute ramps. Test assemblies were then conditioned for 24 hours at ambient condition 23+/−2° C. and 50+/−5% relative humidity before testing. Per example material 3 adhesive peel strength test assemblies were prepared and the test results averaged. Test results were reported in N/25 mm.

3. Crash Resistance (Dynamic Wedge Impact Test)

The dynamic wedge impact was determined according to ISO method 11343. The test was performed using a Dynatub Impact Test Machine, Model 9200 (commercially available from Instron, Norwood, USA). The method is based on driving a wedge into adhesively bonded metal substrates by a falling weight. Tests were performed at room temperature (23° C.+/−2° C. and 50+/−5% relative humidity). For test assembly preparation a hot dipped galvanized steel strip (commercially available by Etalon steel, reference GC 300500AA from Societee Etalon; France) having a dimension of 100 mm×20 mm×0.8 mm and coated with 3 g/m² Oil (PL 3802-39s commercially available from Fuchs Petrolub AG, Germany) was marked in the bond area (30 mm×20 mm) with a masking tape (Scotch™ 2610 Masking Tape; commercially available from 3M, USA). The example material to be tested was then applied onto the marked bond area on the first steel strip and covered by a second steel strip having the same dimension as the first. The two strips were then manually pressed together and hereafter clamped together using 2 binder clips along the bond line, in order to hold the test assembly in place. All test assemblies were then cured for 30 minutes at 180° C. in an air circulating oven. Hereby the test assemblies were heated up and cooled down using 3° C./minute ramps. Test assemblies were then conditioned for 24 hours at ambient condition 23+/−2° C. and 50+/−5% relative humidity before testing.

The fully cured and conditioned test assemblies were then placed onto the wedge and a 21 kg falling weight was driven at 2 m/s through the adhesive bond line. During impact the former kinetic energy is partially absorbed within the test assemblies and the degree of energy absorption can be correlated directly with the fracture energy. Per example formulation 3 dynamic wedge impact test assemblies were prepared and the test results averaged. Test results were reported in Joule.

4. Wash-Out Test

To illustrate a vehicle door, small sized hem flanges were fabricated.

Hereby a hem flange was formed by using two steel panels (commercially available as Etalon steel, reference GC 300500AA from Societee Etalon; France) having a dimension of 200 mm×200 mm×1 mm and in a first step applying an example film sheet having a dimension of 200 mm×20 mm×0.7 mm on the edge of the first steel panel. In a second step the extended edge portion of the first steel panel (the length of the extended portion was between 7-8 mm) was folded back over the edge portion of the second steel panel positioning the example film sheet directly between the two steel panels. The resulting test assemblies were then dipped for 15 minutes into a to 55° C. pre-warmed watery solution comprising 3 wt. % cleaner (commercially available as LKW Reiniger from Chemische Fabrik Dr. Stöcker GmbH; Duisburg; Germany). All test assemblies were then cured for 30 minutes at 180° C. in an air circulating oven. Hereby the test assemblies were heated up and cooled down using 3° C./minute ramps. Test assemblies were then conditioned for 24 hours at ambient condition 23+/−2° C. and 50+/−5% relative humidity before testing. All test assemblies were then inspected visually. Test assemblies delivering porously cured bond lines were considered as a FAIL and test assemblies showing well sealed bond lines without noticeable bubbles were rated as a PASS.

TABLE 1

List of materials

| Material | Function | Description |
|---|---|---|
| DER 671 | Solid epoxy resin | Trade designation of a solid reaction product of epichlorohydrin and bisphenol A having an approximate epoxy equivalent weight of 475-550 grams/equivalent according to ASTM D 1652. Commercially available by Dow Chemical Co. |
| D.E.R 6508 | Solid epoxy resin | Trade designation of a diglycidyl ether of bisphenol A having an approximate epoxy equivalent weight of 380-420 grams/equivalent according to ASTM D 1652. Commercially available by Dow Chemical Co. |

TABLE 1-continued

List of materials

| Material | Function | Description |
|---|---|---|
| Epikote 828 | Liquid epoxy resin | Trade designation of a liquid reaction product of epichlorohydrin and bisphenol A having an approximate epoxy equivalent weight of 184-190 grams/equivalent. Commercially available by Resolution Performance Products. |
| Erisys GE 36 | Flexibilizing agent | Trade designation of a triglycidyl ether of propoxylated glycerine. Commercially available by CVC Speciality Chemicals, USA |
| Genioperl P52 | Thoughener | Trade designation of crosslinked silicone core and a shell based on an organic polymer. Commercially available by Wacker Silicones, Germany. |
| Amicure CG1200 | Primary Curative | Trade designation of 2-cyanoguanidine (dicyandiamide), available from Air Products |
| Omicure U52M | Curative accelerator | Trade designation of 4,4 methylene bisphenyl dimethyl urea, available from CVC Speciality Chemicals, USA |
| Micropearl F190D | Physical foaming agent | Trade designation of a thermoexpandable microcapsule produced by encapsulating volatile hydrocarbon with acrylic copolymer |
| MinSil 20 | Fused Silica | Trade designation of fused silica commercially available by Minco, Inc., USA |
| Aerosil R202 | Silica filler/ hydrophobizing agent | Trade designation of a fumed silica aftertreated with a polydimethysiloxane, available commercially by Degussa AG, Germany |

EXAMPLES

Preparation of Examples 1-4

The epoxy-based compositions of the present invention were prepared by combining the ingredients from the list of materials of table 1 in a 2 l planetary mixer (available from Fa. Herbst; Buxtehude, Germany). In table 2, all concentrations are given as wt. %.

A mixer temperature of 80° C. was maintained during the melting and mixing process of the high epoxy equivalent weight epoxy (either D.E.R 671 or D.E.R 6508) with the low epoxy equivalent weight epoxy resin (Epikote 828), using oil heating. Once the solid epoxy resin was completely melted, the homogenous blend of the epoxy resins was kept at a temperature of 80° C. and the thoughener (Genioperl P52) together with the silica filler/hydrophobizing agent (Aerosil R202) added. Further melting and dispersing for 60 minutes was completed to ensure complete dispersion of all ingredients. Then the mixer temperature was reduced to 60° C. and the two curatives (Amnicure CG1200 and Omnicure U.52M) together with the physical foaming agent (Micropearl F 190D) added to the mixture, followed by mixing for an additional 30 minutes under vacuum. All of these mixtures were pastes having a uniform consistency and were dumped into heated drums after completion of the mixing process. From these drums the mixtures were hot-melt coated to a film thickness of 0.7 mm. The formed films were soft and homogenous when cooled down.

TABLE 2

| | Weight % | | | |
|---|---|---|---|---|
| Raw Material | Example 1 | Example 2 | Example 3 | Example 4 |
| D.E.R 671 | 38.00 | 0 | 45 | 25 |
| D.E.R 6508 | 0 | 38.00 | 0 | 0 |
| Epikote 828 | 17.00 | 17.00 | 10 | 30 |
| Erisys GE 36 | 5.00 | 5.00 | 5.00 | 5.00 |
| Minsil SF 20 | 12.00 | 12.00 | 12.00 | 12.00 |
| Genioperl P52 | 19.00 | 19.00 | 19.00 | 19.00 |
| Amicure CG1200 | 2.50 | 2.50 | 2.50 | 2.50 |
| Omicure U52M | 1.00 | 1.00 | 1.00 | 1.00 |
| Aerosil R202 | 5.00 | 5.00 | 5.00 | 5.00 |
| Micropearl F190D | 0.50 | 0.50 | 0.50 | 0.50 |
| Ratio Solid/Liquid Epoxy | 2.2 | 2.2 | 4.5 | 0.8 |

TABLE 3

| Test Method | Example 1 | Example 2 | Example 3 | Example 4 |
|---|---|---|---|---|
| Overlap Shear Strength at RT (Mpa) | 19 MPa | | | |
| Overlap Shear Strength at 80° C. (MPa) | 12 MPa | | | |
| Overlap Shear Strength at −40° C. (MPa) | 15 MPa | | | |
| Peel Strength at RT (N/25 mm) | 200 | | | |
| Dynamic Wedge Impact at RT | 15 Joule | | | |
| Wash-Out Resistance | Pass | Fail | Fail | Fail |

The invention claimed is:

1. A method of making a metal part assembly, the method comprising:
   providing a first metal part and a second metal part;
   providing an adhesive sheet having a first portion near a first end of the adhesive sheet and a second portion near a second end opposite to the first end of the adhesive sheet, the adhesive sheet comprising a thermosettable composition that comprises a mixture of a first epoxy compound, a second epoxy compound, and an epoxy curing agent,
   wherein the first epoxy compound has a weight average molecular weight of at least 1000 g/mol and has an amount of epoxy groups of between 5 and 10mole% and the second epoxy compound has a weight average molecular weight of not more than 400 g/mol and wherein a weight ratio of the first epoxy compound to the second epoxy compound is between 0.8 and 4,
   wherein the first metal part comprises a first metal panel having a first body portion and a first flange along a margin of the first body portion adjacent a first end of the first body portion;
   wherein the second metal part comprises a second metal panel having a second body portion and a second flange along a margin of the second body portion adjacent a second end of the second body portion;

wherein a metal joint is obtained by the adhesive sheet being adhered to one of said first metal panel and second metal panel and the first flange of the first metal panel being folded over said second flange of said second metal panel; and wherein the adhesive sheet is folded such that the first portion of the adhesive sheet is between the second flange of said second metal panel and said first body portion of said first metal panel and the second portion of the adhesive sheet is between said first flange of said first metal panel and said second flange of said second metal panel; and heating the metal joint so as to cause thermosetting of the thermosettable composition of the adhesive sheet.

2. A method according to claim 1 wherein said adhesive sheet is adhered to said second metal panel with the adhesive sheet being adhered to the second flange of the second metal panel and folded around the second end of the second metal panel such that the adhesive sheet is adhered to opposite sides of the second flange of the second metal panel.

3. A method according to claim 1 wherein the thermosettable composition further comprises a hydrophobizing agent.

4. A method according to claim 1 wherein the weight average molecular weight of the first epoxy compound is between 1000 and 3000 g/mol.

5. A method according to claim 1 wherein the thermosettable composition further comprises a blowing agent.

6. A method according to claim 5 wherein the blowing agent is encapsulated.

7. A method according to claim 1 wherein the thermosettable composition further comprises a toughening agent.

8. A method according to claim 1 wherein the adhesive sheet comprises a netting.

9. A method according to claim 1 wherein between forming the metal joint and heating of the metal joint, the metal joint is painted.

10. A method according to claim 1 wherein the heating of the metal joint is carried out in one or more steps at a temperature between 60 and 200° C.

* * * * *

UNITED STATES PATENT AND TRADEMARK OFFICE
CERTIFICATE OF CORRECTION

PATENT NO.        : 9,452,462 B2
APPLICATION NO.   : 14/122289
DATED             : September 27, 2016
INVENTOR(S)       : Sohaib Elgimiabi It is certified that error appears in the above-identified patent and that said Letters Patent is hereby corrected as shown below:

In the Specification

Column 7
Line 32, delete "No." and insert -- Nos. --

Column 8
Line 3, delete "sulfone," and insert -- sulfone, --

Lines 15-16 (approx.), delete "methylnorbornenephthalic" and insert -- methylnorbornenenaphthalic --

Column 10
Line 10, delete "CAB-O-S1L™" and insert -- CAB-O-SIL™ --

Line 67, delete "Societee" and insert -- Societe --

Column 11
Line 27, delete "Societee" and insert -- Societe --

Line 56, delete "Dynatub" and insert -- Dynatup --

Line 64, delete "Societee" and insert -- Societe --

Column 12
Line 29, delete "Societee" and insert -- Societe --

Signed and Sealed this
Eighteenth Day of April, 2017

Michelle K. Lee
*Director of the United States Patent and Trademark Office*